US008213635B2

(12) United States Patent
Li et al.

(10) Patent No.: US 8,213,635 B2

(45) Date of Patent: Jul. 3, 2012

(54) KEYSTROKE SOUND SUPPRESSION

(75) Inventors: Qin Li, Houston, TX (US); Michael Lewis Seltzer, Seattle, WA (US); Chao He, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 879 days.

(21) Appl. No.: 12/328,789

(22) Filed: Dec. 5, 2008

(65) Prior Publication Data

US 2010/0145689 A1 Jun. 10, 2010

(51) Int. Cl.

*H04B 15/00* (2006.01)
*G10L 11/06* (2006.01)

(52) U.S. Cl. ....................................... 381/94.1; 704/210

(58) Field of Classification Search ........ 381/94.1–94.9; 704/210

See application file for complete search history.

(56) References Cited

U.S. PATENT DOCUMENTS

| | | | | |
|---|---|---|---|---|
| 5,550,924 | A | 8/1996 | Helf et al. | |
| 6,453,285 | B1 | 9/2002 | Anderson et al. | |
| 7,206,418 | B2 | 4/2007 | Yang et al. | |
| 7,292,985 | B2 * | 11/2007 | Jiang et al. | 704/271 |
| 2002/0039425 | A1 * | 4/2002 | Burnett et al. | 381/94.7 |
| 2002/0156623 | A1 * | 10/2002 | Yoshida | 704/226 |
| 2006/0167995 | A1 * | 7/2006 | Rui | 709/204 |
| 2007/0021205 | A1 | 1/2007 | Filer et al. | |
| 2008/0044036 | A1 | 2/2008 | Konchitsky | |
| 2008/0118082 | A1 | 5/2008 | Seltzer et al. | |
| 2008/0279366 | A1 * | 11/2008 | Lindbergh | 379/421 |

FOREIGN PATENT DOCUMENTS

WO 0038044 A1 6/2000

OTHER PUBLICATIONS

"SoliCall 1.5.0", retrieved at << http://www.download3k.com/Internet/Telephony-SMS-GSM/Download-SoliCall.html >>, Oct. 17, 2008, pp. 1-2.

"Adaptive Noise Reduction", retrieved at << http://www.izotope.com/tech/anr/ >>, Oct. 17, 2008, pp. 1-2.

"Release Notes Polycom HDX Systems, Version 2.0.1", retrieved at << http://www.vidofon.de/media/hdx_RelNotes201_006a_dt.pdf >>, Nov. 2007, pp. 1-34.

Subramanya, et al., "Automatic Removal of Typed Keystrokes from Speech Signals", IEEE Signal Processing Letters, vol. 14, No. 5, May 2007, pp. 363-366.

* cited by examiner

*Primary Examiner* — Samuel G Neway

(74) *Attorney, Agent, or Firm* — Hope Baldauff Hartman, LLC

(57) ABSTRACT

An audio signal is received that might include keyboard noise and speech. The audio signal is digitized and transformed from a time domain to a frequency domain. The transformed audio is analyzed to determine whether there is likelihood that keystroke noise is present. If it is determined there is high likelihood that the audio signal contains keystroke noise, a determination is made as to whether a keyboard event occurred around the time of the likely keystroke noise. If it is determined that a keyboard event occurred around the time of the likely keystroke noise, a determination is made as to whether speech is present in the audio signal around the time of the likely keystroke noise. If no speech is present, the keystroke noise is suppressed in the audio signal. If speech is detected in the audio signal or if the keystroke noise abates, the suppression gain is removed from the audio signal.

20 Claims, 3 Drawing Sheets

KEYSTROKE SOUND SUPPRESSION

BACKGROUND

Desktop and laptop personal computers are increasingly being used as devices for sound capture in a variety of recording and communication scenarios. Some of these scenarios include recording of meetings and lectures for archival purposes and the capture of speech for voice over Internet protocol ("VOIP") telephony, video conferencing, and audio/video instant messaging. In these applications, audio input is typically captured using a local microphone. In many cases, such as with laptop computers, the microphone may be built into the computer itself and located very close to a keyboard. This type of configuration is highly vulnerable to environmental noise sources being picked up by the microphone. In particular, this configuration is particularly vulnerable to a specific type of additive noise, that of a user simultaneously using a user input device, such as typing on the keyboard of the computer being used for sound capture.

Continuous typing on a keyboard, mouse clicks, or stylus taps, for instance, produce a sequence of noise-like impulses in the captured audio stream. The presence of this non-stationary, impulsive noise in the captured audio stream can be very unpleasant for a downstream listener. In the past, some attempts have been made to deal with impulsive noise generated by keystrokes. However, these attempts have typically included an attempt to explicitly model the keystroke noise and to remove the keystroke noise from the audio stream. This type of approach presents significant problems, however, because keystroke noise (and other user input noise, for that matter) can be highly variable across different users and across different keyboard devices. Moreover, these previous attempts are computationally expensive, thereby making them unacceptable for use in a real time communication environment where low latency is a primary goal.

It is with respect to these considerations and others that the disclosure made herein is presented.

SUMMARY

Technologies are described herein for keystroke sound suppression. In particular, through the utilization of the concepts and technologies presented herein, keystroke noise in an audio signal is identified and suppressed by applying a suppression gain to the audio signal when keystroke noise is detected in the absence of speech. Because no attempt is made to model the keystroke noise or to remove the keyboard noise from the audio stream, the concepts and technologies presented herein are suitable for use in a real time communication environment where low latency is a primary goal.

In one implementation, an audio signal is received that might include keyboard noise and/or speech. The audio signal is digitized into a sequence of frames and each frame is transformed from a time domain to a frequency domain for analysis. The transformed audio is then analyzed to determine whether there is a high likelihood that keystroke noise is present in the audio. High likelihood of keystroke noise means that the probability of keystroke noise is higher than a predefined threshold. In one embodiment, the analysis is performed by selecting one of the frames as a current frame. A determination is then made as to whether other frames surrounding the current frame can be utilized to predict the value of the current frame. If the current frame cannot be predicted from the surrounding frames, then there is a high likelihood that keystroke noise is present in the audio signal at or around the current frame.

If it is determined there is high likelihood that the audio signal contains keystroke noise, a determination is made as to whether a keyboard event occurred around the time of the keystroke noise. In order to perform this function, keystroke information is received in one embodiment from an input device application programming interface ("API") that is configured to deliver the keystroke information with minimal intervention, and therefore minimal latency, from an operating system. The keystroke information is received asynchronously and may identify that either a key-up event or a key-down event occurred. The determination as to whether a keyboard event occurred contemporaneously with the keystroke noise is made based upon the keystroke information received from the input device API in one embodiment.

If it is determined that a keyboard event occurred around the time possible keystroke noise was detected, a further determination is made as to whether speech is present in the audio signal around the time of the keystroke noise. A voice activity detection ("VAD") component is utilized in one embodiment to make this determination. If no speech is present, the keystroke noise is suppressed in the audio signal. In one embodiment, an automatic gain control ("AGC") component applies a suppression gain to the audio signal to thereby suppress the keystroke noise in the audio signal. If speech is detected in the audio signal or if the keystroke noise abates, the suppression gain is removed from the audio signal.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
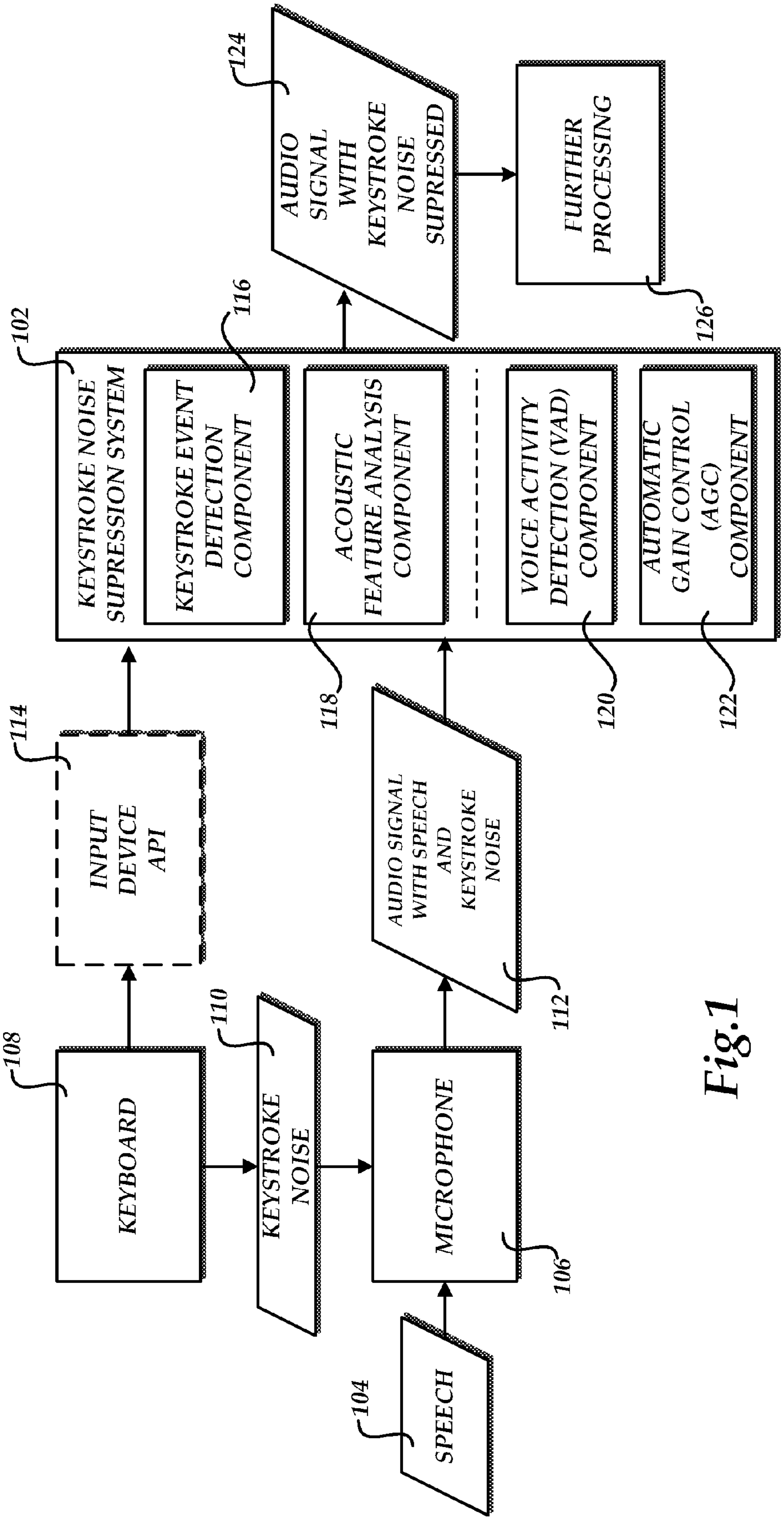
FIG. 1 is a software and hardware architecture diagram showing aspects of a keystroke noise suppression system provided in embodiments presented herein.

The following detailed description is directed to concepts and technologies for keystroke noise suppression. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks, implement particular abstract data types, and transform data. Moreover, those skilled in the art will appreciate that the subject matter described herein may be practiced with or tied to other specific computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, technologies for deterministically selecting a domain controller will be described.

Turning now to FIG. 1, aspects of a keystroke noise suppression system 102 presented herein and an illustrative operating environment for its execution will be described. It should be appreciated that while the embodiments presented herein are described in the context of the suppression of keystroke noise, the concepts and technologies disclosed herein are also applicable to the suppression of impulsive noise generated by other types of user input devices. For instance, the implementations disclosed herein may also be utilized to suppress noise generated by computer mice and touch screen devices that are used with a stylus. It should also be appreciated that while the system 102 presented herein is described in the context of suppressing keyboard noise from an audio signal that includes speech, it may be utilized to suppress impulsive noise in any kind of audio signal.

In the environment shown in FIG. 1, a keyboard 108 may be utilized to provide input to a suitable computing system. Keys on conventional keyboards are mechanical pushbutton switches. Therefore, if the audio generated by typing on the keyboard 108 is recorded, the audio generated by a typed keystroke will appear in the audio signal 112 as two closely spaced noise-like impulses, one generated by the key-down action and the other by the key-up action. The duration of a keystroke is typically between 60-80 ms, but may last up to 200 ms.

Keystrokes can be broadly classified as spectrally flat. However, the inherent variety of typing styles, key sequences, and the mechanics of the keys themselves introduce a degree of randomness in the spectral content of a keystroke. This leads to a significant variability across frequency and time for even the same key. The keystroke noise suppression system 102 shown in FIG. 1 and described herein is capable of suppressing keystroke noise in an audio signal 112 even in view of this significant variability across frequency and time.

According to one embodiment, a user provides a speech signal 104 to a microphone 106. The microphone 106 also receives keystroke noise 110 from the keyboard 108 that is being used by the user. The microphone 106 therefore provides an audio signal 112 that might include speech and keyboard noise to the keystroke noise suppression system 102. It should be appreciated that at any given time, the signal 112 may include silence or other background noise, keyboard noise only, speech only, or keyboard noise and speech.

In one implementation, the keystroke noise suppression system 102 includes a keystroke event detection component 116 and an acoustic feature analysis component 118. A voice activity detection ("VAD") component 120 and an automatic gain control ("AGC") component 122 may also be provided by the keystroke noise suppression system 102 or by an operating system.

As shown in FIG. 1, the keystroke noise suppression system 102 is configured in one embodiment to identify keystroke noise 110 in the input audio signal 112 and to output an audio signal 124 wherein the keystroke noise 124 has been suppressed. The audio signal 124 may also be provided to another software component for further processing 126, such as for playback by a remote computing system, such as in the case of VOIP communications.

According to one implementation, the acoustic feature analysis component 118 is configured to receive the audio signal 112 and to perform an analysis on the audio signal 112 to determine whether there is high likelihood that keystroke noise 110 is present in the audio signal. In particular, the acoustic feature analysis component 118 is configured in one embodiment to take the digitized audio signal 112 and to subdivide the digitized audio signal 112 into a sequence of frames. The frames are then transformed from the time domain to the frequency domain for analysis.

Once the audio signal 112 had been transformed to the frequency domain, the acoustic feature analysis component 112 analyzes the transformed audio signal 112 to determine whether there is likelihood that keystroke noise 110 is present in the audio 112. In one embodiment, the analysis is performed by selecting one of the frames as a current frame. The acoustic feature analysis component 118 then determines whether other frames of the audio signal 112 surrounding the current frame can be utilized to predict the value of the current frame. If the current frame cannot be predicted from the surrounding frames, then there is high likelihood that keystroke noise 110 is present in the audio signal 112 at or around the current frame.

The measure of likelihood that keystroke noise 110 is present in the audio signal 112 can be summarized by the equation shown in Table 1.

TABLE 1

$$Fn = \sum_{k=0}^{K-1} \frac{\left[S(k, n) - \frac{1}{2M} \sum_{m=-M, m\neq 0}^{m=M} S(k, n-m)\right]^2}{\frac{1}{2M} \sum_{m=-M, m\neq 0}^{m=M} S(k, n-m)^2}$$

In the equation shown in Table 1, S(k,n) represents the magnitude of a short-time Fourier transform ("STFT") over the audio signal 112, wherein the variable k is a frequency bin index and the variable n is a time frame index. The likelihood that a current frame of the audio signal 112 includes keystroke noise is computed over the frame range [n−M, n+M]. A typical value of M is 2. The computed likelihood is compared to a fixed threshold to determine whether there is high likelihood that the audio signal 112 contains keystroke noise. The fixed threshold may be determined empirically.

The likelihood function shown in Table 1 is not, by itself, a completely reliable measure of the likelihood that keystroke noise 110 is present in the audio signal 112. Precisely, the equation in Table 1 is a measure of signal predictability, i.e. how well the current frame spectrum can be predicted by its neighbors. Because typing noise is very transient, so it cannot be predicted by its neighbor frames, and results in a large value for $F_n$. However, many other transient sounds or interferences can also produce a high value of $F_n$, for example the sound of a pen dropped onto a hard table. Even a normal voice speaking explosive consonants like "t" and "p" can produces a high value of $F_n$.

In order to improve the likelihood calculations, keyboard events generated by the computing system upon which the keystroke noise suppression system 102 is executing are utilized to constrain the likelihood calculations described above. In particular, on many types of computing systems a key-down event and a key-up event will be generated when a key is pressed or released, respectively, on the keyboard 108. For each frame of the audio signal 112, if the likelihood computation described above determines that it is likely that keystroke noise 110 is present and a key-down or key-up event is located proximately to the current frame, keystroke noise 110 is considered to be present.

In order to determine whether key-down or key-up events have been generated, the keystroke event detection component 116 is configured to utilize the services of an input device API 114. The input device API 114 provides an API for asynchronously delivering keystroke information, such as key-up events and key-down events, with minimal intervention from the operating system and low latency. The WINDOWS family of operating systems from MICROSOFT CORPORATION provides several APIs for obtaining keystroke information in this manner. It should be appreciated, however, that other operating systems from other manufacturers provide similar functionality for accessing keyboard input events in a low latency manner and may be utilized with the embodiments presented herein.

Because keyboard events are generated asynchronously, a separate thread may be created to receive the keystroke information. In this implementation, the keyboard events are pushed into a queue maintained by a detection thread and consumed by a processing function in a main thread. In one embodiment, the queue is implemented by a circular buffer that is designed to be lock- and wait-free while also maintaining data integrity. It should be appreciated that other implementations may be utilized.

According to one embodiment, when the likelihood computation described above is higher than a threshold, keyboard events are located that have occurred contemporaneously with the keystroke noise 110. In one implementation, for instance, keyboard events occurring within −10 ms to 60 ms of the peakness location are identified. If one or more keyboard events are found in the search range, it is assumed that keystroke noise 110 is present. The frames within a certain duration of the peakness location are considered corrupted by the keystroke noise 110. The duration of corruption typically lasts 40 ms to 100 ms depending upon the peakness strength.

If the keystroke noise suppression system 102 determines that keystroke noise 110 is present during a particular group of frames based upon the likelihood computation and the keyboard event data, the voice activity detection ("VAD") component 120 is utilized to determine whether speech 104 is also occurring within the frames. As known in the art, VAD refers to the process of determining whether an audio signal includes the presence or absence of voice. Various algorithms exist for making this determination.

If speech 104 exists within the frames that have been determined to be corrupted by keystroke noise 110, the results from the VAD component 120 are ignored and no status change occurs. However, if speech 104 does not exist within the frames that have been determined to be corrupted by keystroke noise 110, then the AGC component 122 is instructed to apply a suppression gain to the frames to thereby minimize the keystroke noise 110. For instance, in one embodiment, the suppression gain may be −30 dB to −40 dB.

According to one embodiment, only frames of the audio signal 112 that have not been determined to be corrupted by keystroke noise 110 are provided to the VAD component 120 for the determination as to whether voice is present in the frames. In this manner, only uncorrupted frames are utilized by the VAD component 120 to determine voice activity.

The output of the AGC component 122 is the audio signal 124 that has the keystroke noise 110 contained therein suppressed. As described briefly above, the audio signal 124 may be provided to another software component for further processing 126. For instance, further processing 126 might include the transmission of the audio signal 124 as part of a VOIP conversation. Additional details regarding the operation of the keystroke noise suppression system 102 will be provided below with respect to FIG. 2.

Figure 2:
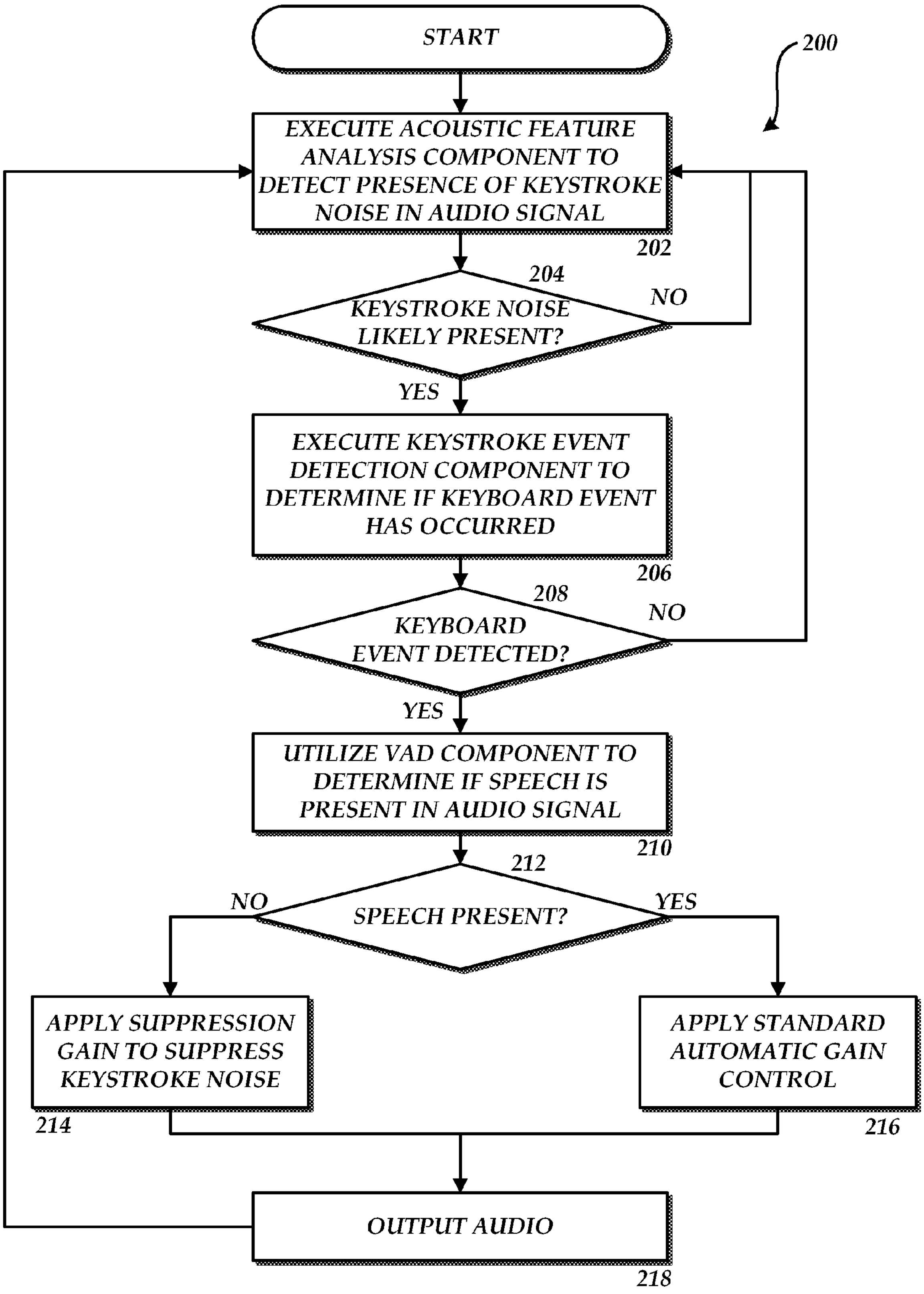
FIG. 2 is a flow diagram showing a routine that illustrates the operation of a keystroke noise suppression system presented herein according to one embodiment.

Referring now to FIG. 2, additional details will be provided regarding the embodiments presented herein for keyboard noise suppression. In particular, FIG. 2 is a flow diagram showing a routine 200 that illustrates aspects of the operation of the keystroke noise suppression system 102 described above with respect to FIG. 1.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the acoustic feature analysis component 118 is executed in the manner described above to determine the likelihood that keystroke noise 110 is present in the audio signal 112. From operation 202, the routine 200 proceeds to operation 204, where a determination is made as to whether there is high likelihood that keystroke noise 110 is present. If there is no or low likelihood that keystroke noise is present, the routine 200 moves back to operation 202, where the execution of the acoustic feature analysis component 118 continues.

If, at operation 204, the acoustic feature analysis component 118 determines that the likelihood that keystroke noise 110 is present in the audio signal 112 exceeds a pre-defined threshold, the routine 200 proceeds to operation 206. At operation 206, the keystroke event detection component 116 is executed to determine whether a keyboard event has occurred contemporaneously with the keystroke noise 110. Although the routine 200 indicates that the keystroke event detection component 116 is executed after the acoustic feature analysis component 118, it should be appreciated that these components are executed concurrently in one embodiment. In this manner, and as described above, keyboard event information is continually received asynchronously from the input device API 114 and placed in a queue. When the acoustic feature analysis component 118 detects likelihood of keystroke noise 110, the contents of the queue can be searched for contemporaneous keyboard events.

If, at operation 208, the keystroke event detection component 116 concludes that no contemporaneous keyboard events are present, the routine 220 proceeds to operation 202, described above. If, however, one or more keyboard events are detected around the time of the detected keystroke noise 110, the routine 200 proceeds from operation 208 to operation 210. At operation 210, the VAD component 120 is utilized to determine whether speech 104 exists in the frames for which keystroke noise 110 has been detected. If the VAD component 120 determines that speech 104 is present, the routine 200 proceeds from operation 212 to operation 216. At operation 216, the AGC component 132 applies standard AGC to the frames. It should be appreciated that no gain control may be applied to frames containing speech in one embodiment.

If, at operation 210, the VAD component 120 determines that speech 104 is not present in the frames, the routine 200 proceeds from operation 212 to operation 214. At operation 214, the AGC component 122 applies suppression gain to the frames to suppress the detected keystroke noise 110. From operations 214 and 216, the routine 200 proceeds to operation 218, where the audio 124 is output to a software component for further processing 126. From operation 218, the routine 200 returns to operation 202, described above, where subsequent frames of the audio signal 112 are processed in a similar manner as described above. It should be appreciated that the operations shown in FIG. 2 may be continuously repeated over the audio signal 112 as long as the signal 112 is active.

In one embodiment, a two second "hangover" time is added when a determination is made that speech is present. This means that if speech is detected at operation 212, the following two seconds of audio are considered to have speech present regardless of whether speech is actually present or not. It should be appreciated that the hangover time is two seconds in one embodiment, but that another period of time may be utilized.

Figure 3:
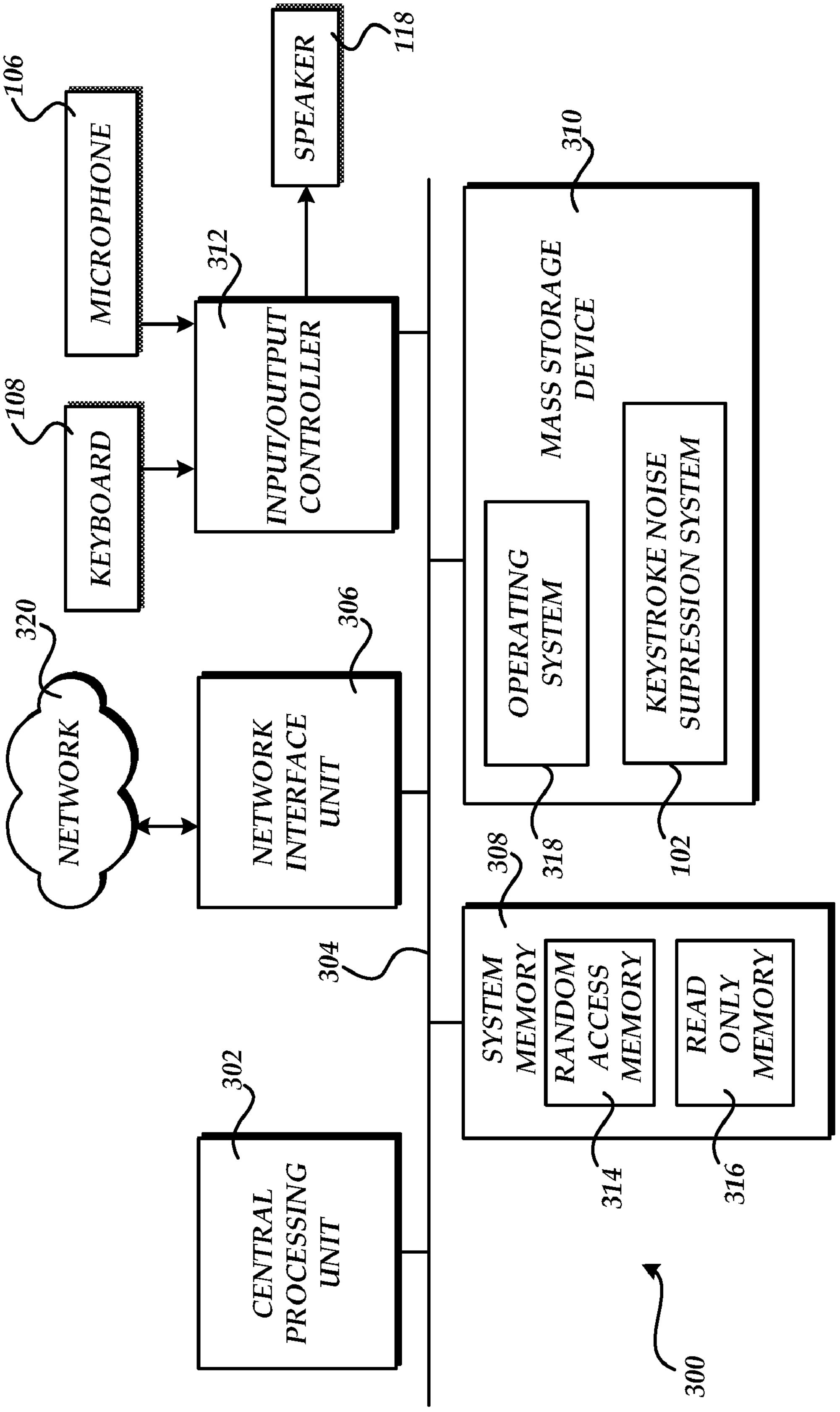
FIG. 3 is a computer architecture diagram showing an illustrative computer hardware and software architecture for a computing system capable of implementing aspects of the embodiments presented herein.

FIG. 3 shows an illustrative computer architecture for a computer 300 capable of executing the software components described herein. The computer architecture shown in FIG. 3 illustrates a conventional desktop, laptop, or server computer and may be utilized to execute any aspects of the software components presented herein.

The computer architecture shown in FIG. 3 includes a central processing unit 302 ("CPU"), a system memory 308, including a random access memory 314 ("RAM") and a read-only memory ("ROM") 316, and a system bus 304 that couples the memory to the CPU 302. A basic input/output system containing the basic routines that help to transfer information between elements within the computer 300, such as during startup, is stored in the ROM 316. The computer 300 further includes a mass storage device 310 for storing an operating system 318, application programs, and other program modules, which have been described in greater detail herein.

The mass storage device 310 is connected to the CPU 302 through a mass storage controller (not shown) connected to the bus 304. The mass storage device 310 and its associated computer-readable media provide non-volatile storage for the computer 300. Although the description of computer-readable media contained herein refers to a mass storage device, such as a hard disk or CD-ROM drive, it should be appreciated by those skilled in the art that computer-readable media can be any available computer storage media that can be accessed by the computer 300.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network such as the network 320. The computer 300 may connect to the network 320 through a network interface unit 306 connected to the bus 304. It should be appreciated that the network interface unit 306 may also be utilized to connect to other types of networks and remote computer systems. The computer 300 may also include an input/output controller 312 for receiving and processing input from a number of other devices, including a keyboard 108, a microphone 106, a mouse, or an electronic stylus. Similarly, an input/output controller may provide output to a display screen, a printer, a speaker 118, or other type of output device.

As mentioned briefly above, a number of program modules and data files may be stored in the mass storage device 310 and RAM 314 of the computer 300, including an operating system 318 suitable for controlling the operation of a networked desktop, laptop, or server computer. The mass storage device 310 and RAM 314 may also store one or more program modules. In particular, the mass storage device 310 and the RAM 314 may store the keystroke noise suppression system 102, which was described in detail above with respect to FIGS. 1-2. The mass storage device 310 and the RAM 314 may also store other types of program modules and data.

Based on the foregoing, it should be appreciated that technologies for keyboard noise suppression are provided herein. Although the subject matter presented herein has been described in language specific to computer structural features, methodological acts that include transformations, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for suppressing keystroke noise in an audio signal, the method comprising:
- receiving the audio signal;
- transforming the audio signal from a time domain to a frequency domain;
- analyzing the transformed audio signal to determine the likelihood that keystroke noise is present in the audio signal;
- in response to determining that there is high likelihood that keystroke noise is present in the audio signal, determining whether a keyboard event occurred contemporaneously with the likely keystroke noise;
- in response to determining that a keyboard event has occurred contemporaneously with the likely keystroke noise, determining whether speech is present in the audio signal; and
- in response to determining that speech is not present in the audio signal, suppressing the keystroke noise in the audio signal.

2. The method of claim 1, wherein analyzing the audio signal to determine whether there is a likelihood that keystroke noise is present in the audio signal comprises:

segmenting the audio signal into a sequence of frames;

selecting a current frame from the sequence of frames;

determining whether the current frame can be predicted well from two or more frames surrounding the current frame; and if the current frame cannot be predicted well from the frames surrounding the current frame, determining that there is a high likelihood that keystroke noise is present in the audio signal.

3. The method of claim 1, wherein determining whether a keyboard event occurred contemporaneously with the keystroke noise comprises:

receiving keystroke information from a input device application programming interface (API), the input device API configured to deliver the keystroke information with minimal intervention from an operating system; and determining based upon the keystroke information received from the input device API whether a keyboard event occurred contemporaneously with the keystroke noise.

4. The method of claim 3, wherein the keystroke information is received from the input device API asynchronously.

5. The method of claim 4, wherein the keystroke information identifies either a key-up event or a key-down event.

6. The method of claim 1, wherein determining whether speech is present in the audio signal comprises executing a voice activity detection (VAD) component configured to analyze the audio signal to determine whether speech is present.

7. The method of claim 6, wherein only portions of the audio signal that have not been determined to likely have keystroke noise are provided to the VAD component for use in the determination as to whether speech is present in the audio signal.

8. The method of claim 1, wherein suppressing the keystroke noise in the audio signal comprises applying a suppression gain to the audio signal in order to minimize the keystroke noise.

9. A computer-readable medium that is not a signal having computer-executable instructions stored thereon which, when executed by a computer, will cause the computer to:

execute an acoustic feature analysis component configured to receive an audio signal, to transform the audio signal from a time domain to a frequency domain, and to analyze the transformed audio signal to determine whether there is a likelihood that keystroke noise is present in the audio signal;

execute a keystroke event detection component configured to determine whether a keyboard event occurred around a time of the keystroke noise in response to the acoustic feature analysis component determining that there is a high likelihood that keystroke noise is present in the audio signal;

execute a voice activity detection (VAD) component configured to determine whether speech is present in the audio signal in response to the keystroke event detection component determining that a keyboard event occurred around the time of the likely keystroke noise; and to execute an automatic gain control component configured to suppress the keystroke noise in the audio signal in response to the VAD component determining that speech is not present in the audio signal.

10. The computer-readable medium of claim 9, wherein the keystroke event detection component is further configured to receive keystroke information from a input device application programming interface (API) and to determine based upon the keystroke information whether a keyboard event occurred contemporaneously with the keystroke noise, the input device API being configured to deliver the keystroke information with minimal intervention from an operating system.

11. The computer-readable medium of claim 10, wherein the keystroke event detection component is further configured to receive the keystroke information asynchronously.

12. The computer-readable medium of claim 11, wherein the keystroke information identifies either a key-up event or a key-down event.

13. The computer-readable medium of claim 12, wherein the acoustic feature analysis component is configured to determine whether there is a likelihood that keystroke noise is present in the audio signal by segmenting the audio signal into a sequence of frames, selecting a current frame from the sequence of frames, determining whether the current frame can be predicted well from one or more frames surrounding the current frame, and to conclude that there is a high likelihood that keystroke noise is present in the audio signal if the current frame cannot be predicted well from the frames surrounding the current frame.

14. The computer-readable medium of claim 13, wherein only portions of the audio signal that have not been determined to likely have keystroke noise are provided to the VAD component for use in the determination as to whether speech is present in the audio signal.

15. The computer-readable medium of claim 14, wherein suppressing the keystroke noise in the audio signal comprises applying a suppression gain to the audio signal in order to minimize the keystroke noise.

16. A system for suppressing keystroke noise in an audio signal, the system comprising:

an acoustic feature analysis component configured to receive an audio signal, to segment the audio signal into a sequence of frames, to transform the audio signal from a time domain to a frequency domain, and to determine whether there is a likelihood that keystroke noise is present in the audio signal by selecting a current frame from the sequence of frames, determining whether the current frame can be predicted well from one or more frames surrounding the current frame, and to conclude that there is a high likelihood that keystroke noise is present in the audio signal if the current frame cannot be predicted well from the frames surrounding the current frame;

a keystroke event detection component configured asynchronously receive keystroke information from a input device application programming interface (API) and to determine based upon the keystroke information whether a keyboard event occurred around a time of the likely keystroke noise in response to the acoustic feature analysis component determining that there is a likelihood that keystroke noise is present in the audio signal;

a voice activity detection (VAD) component configured to determine whether speech is present in the audio signal in response to the keystroke event detection component determining that a keyboard event occurred around the time of the keystroke noise; and an automatic gain control component configured to suppress the keystroke noise in the audio signal in response to the VAD component determining that speech is not present in the audio signal.

17. The system of claim 16, wherein the input device API is configured to deliver the keystroke information with minimal intervention from an operating system.

18. The system of claim 17, wherein the keystroke information identifies either a key-up event or a key-down event.

19. The system of claim 18, wherein only portions of the audio signal that have not been determined to likely have keystroke noise are provided to the VAD component for use in the determination as to whether speech is present in the audio signal.

20. The system of claim 19, wherein the automatic gain control component is configured to suppress the keystroke noise in the audio signal by applying a suppression gain to the audio signal.

* * * * *

UNITED STATES PATENT AND TRADEMARK OFFICE

CERTIFICATE OF CORRECTION

PATENT NO. : 8,213,635 B2
APPLICATION NO. : 12/328789
DATED : July 3, 2012
INVENTOR(S) : Qin Li et al.

It is certified that error appears in the above-identified patent and that said Letters Patent is hereby corrected as shown below:

Title page, in field (56), under "U.S. Patent Documents" below "2006/0167995 A1* 7/2006 Rui 709/204" insert -- 2006/0287857 A1 12/2006 Saffer --.

Signed and Sealed this
Twentieth Day of November, 2012

David J. Kappos
*Director of the United States Patent and Trademark Office*